July 26, 1938.   C. I. HAYES   2,124,573
ENVELOPING ATMOSPHERE CONTROL
Filed Oct. 21, 1936
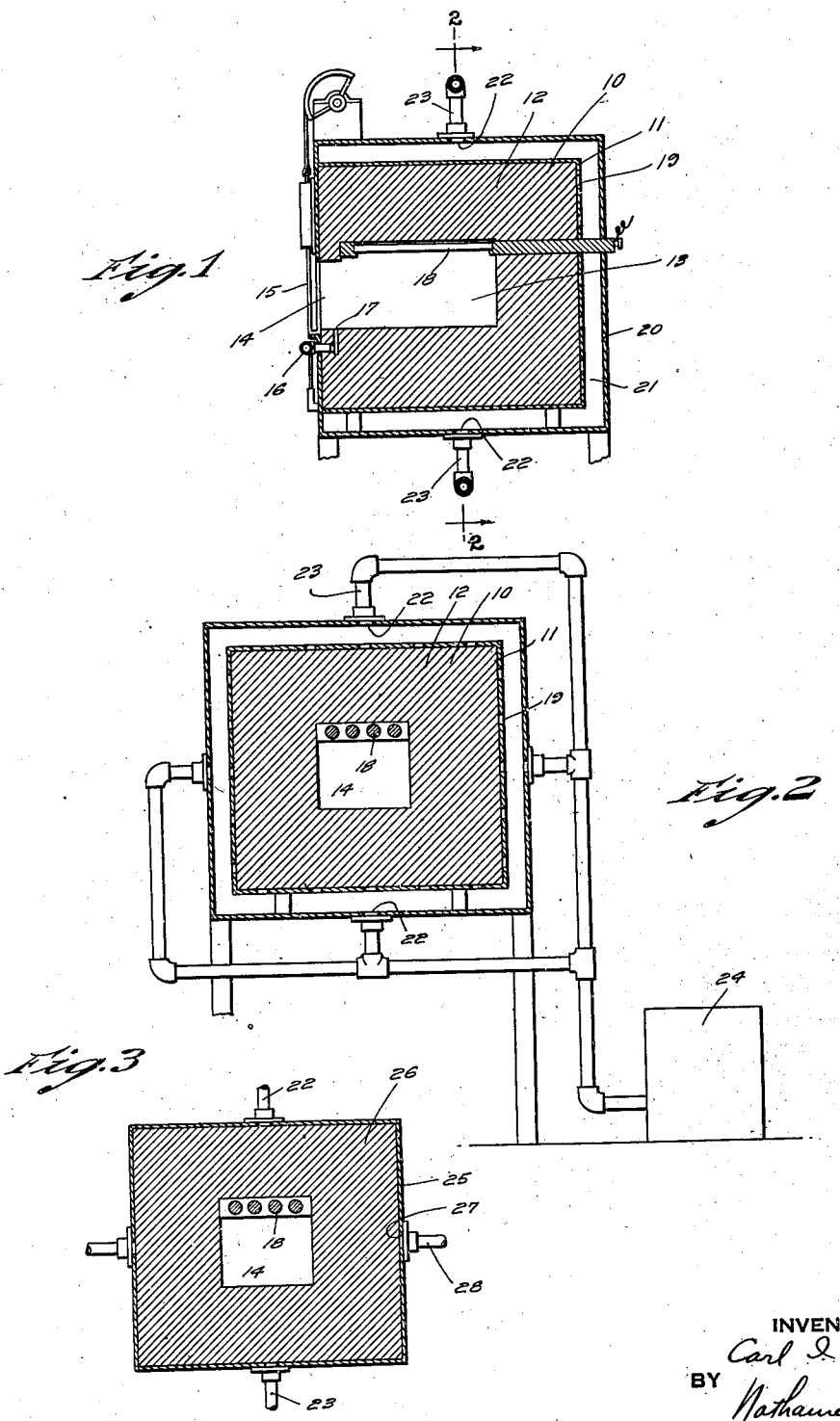
INVENTOR
Carl I. Hayes
BY Nathaniel Frucht
ATTORNEY Patented July 26, 1938

2,124,573

UNITED STATES PATENT OFFICE 2,124,573

ENVELOPING ATMOSPHERE CONTROL

Carl I. Hayes, Providence, R. I.

Application October 21, 1936, Serial No. 106,751

6 Claims. (Cl. 266—5)

My present invention relates to the heat treating art, and has particular reference to a novel control of enveloping atmosphere for materials undergoing heat treatment.

The present heat treating art includes the placing of material for heat treatment within a furnace chamber, and enveloping the material in a gaseous atmosphere having a predetermined constituency, the material and the enveloping atmosphere being subjected to regulated heat.

Since the enveloping atmosphere must be selected so as not to react with the material undergoing heat treatment, different materials require enveloping atmospheres with different constituencies, whereby the change from one material to another in normal commercial heat treating requires a change of atmosphere; the new atmosphere should completely replace the previous atmosphere before the new material is subjected to heat treatment. Moreover, unless a furnace is worked continually, the shut down at night causes a permeation of the furnace with atmospheric air which should also be removed before material is inserted therein for heat treatment.

It is the principal object of my invention to provide a simple arrangement that facilitates the filling of a furnace chamber with a desired enveloping atmosphere. It is a further object of my invention to provide simple and effective means for preventing admixture of contaminating gases with the atmosphere required for the work undergoing heat treatment. It is an additional object of my invention to provide a simple arrangement whereby the furnace may be speedily filled with the proper atmosphere for the material to be heat treated.

With the above and other objects and advantageous features in view, my invention consists of a novel method and a novel arrangement of parts more fully disclosed in the detailed description following, in conjunction with the accompanying drawing, and more specifically defined in the claims appended thereto.

In the drawing:

Fig. 1 is a sectional view of a muffle type furnace embodying the novel invention;

Fig. 2 is a sectional view on the line 2—2 of Fig. 1; and

Fig. 3 is a sectional view of a modified construction.

The proper heat treatment for materials has been found to include the use of an enveloping atmosphere that will not react with the material during the heat treatment. This enveloping atmosphere is different for different materials and any variation creates a deleterious effect on the material and on its surface condition because of the resultant chemical reaction. Since modern furnaces are heavy insulated, and this insulation is of porous material, it has been found that the enveloping atmosphere will permeate throughout the insulation material, whereby a change to a different enveloping atmosphere for heat treating a different material requires a definite period of time before the gases in the insulating material are replaced by the gases forming the new enveloping material and a stable condition is reached. A similar condition occurs when furnaces are shut down at night, as the atmospheric air penetrates into the insulating lining, whereby it has been found that a considerable period of time is necessary before the heat treating atmosphere within the heat treating chamber is properly stabilized. It has thus been found in practice that a period varying from one to four hours is necessary before the furnace begins to function at its highest heat treating efficiency, if started up in the morning; and that a similar time interval is necessary before a change in atmosphere is made in order to heat treat a different material.

Thus, it has heretofore been difficult to utilize a furnace for the heat treatment of tool steel, as an alloy steel of the high chrome high carbon type requires an atmosphere containing a high CO percentage, and a carbon steel of the chisel and die steel type requires an atmosphere containing a substantial percentage of free oxygen.

I have therefore devised an arrangement which facilitates the replacement of one atmosphere in a heat treating furnace with another atmosphere, and which prevents contamination of the second atmosphere by the first, whereby the speed of changing from heat treatment of one material to heat treatment of another material is greatly increased, and the time hitherto necessary to fully remove atmospheric air after a shut down is practically eliminated.

Referring to the drawing, an illustrative heat treatment furnace 10 is shown, comprising a casing 11 in which insulation 12 is mounted around a heat treatment chamber 13, the chamber having a throat 14 through which work may be inserted and removed, with a closure door 15 of standard type. A combustion chamber 16 is positioned adjacent the heat treating chamber, preferably so as to be preheated thereby, and is supplied with air and gas in regulated quantities so as to obtain combusted products of predetermined constituency which pass upwardly through an opening 17, such as a slot extending across the throat, into the heat treating chamber to form an enveloping atmosphere for the work therein and to exclude the entry of atmospheric air into the heat treating chamber, as explained in my prior Patent No. 1,724,583 granted August 13, 1929. The heat treating chamber is preferably heated by electrically heated elements 18, but may be heated in any desired manner, the heating being suitably regulated and controlled to obtain the desired temperature in the chamber. As shown in Figs. 1 and 2, the casing 11 has a plurality of openings 19 extending therethrough, and a second casing 20 is positioned around and spaced from the casing 11 so as to provide a surrounding chamber 21, this chamber 21 having a plurality of openings 22 communicating with conduits 23 connected to a suction pump 24.

When the furnace is started up in the morning, or when it is desired to change the enveloping atmosphere, the pump 24 produces a diminished pressure within the chamber 21 and thus produces a suction effect on the insulating material 12, which induces a flow of the atmosphere in the insulation material into the chamber 21 and to exhaust from the pump 24. The use of reduced pressure in the chamber 21 thus effectively prevents any reversed flow of permeated gases from the insulating material back into the heat treating chamber 13, whereby the entry of gases of predetermined constituency through the opening 17 into the heat treatment chamber cannot be contaminated by seepage of air and gases of different constituency which have been retained in the interstices of the insulating material.

The above described construction therefore permits an immediate use of the furnace after a shut down or after a change from one enveloping atmosphere to a different atmosphere, and ensures operation of the furnace at maximum efficiency during the entire heat treating period.

Although I have described the use of a casing 11 within which the insulating material 12 is mounted, the casing 11 and its openings 19 may be omitted in certain constructions, as the insulating material is self supporting; and in smaller types of furnaces it is feasible to use a casing 25, see Fig. 3, enclosing the insulation 26, and provided with a plurality of ports 27 communicating with conduits 28 which lead to a pump or other suction means (not shown); the thickness of the insulation, which varies from 5 to 15 inches depending on the temperatures for which the furnace is designed, as for example from 1600° to 2300° F., is sufficient to cause the insulation to function directly as a passageway means for the gases which have penetrated therein, and to permit a reasonably free flow of such gases to the suction producing means, whereby all tendency to flow back into the heat treating chamber is eliminated.

While I have described a specific embodiment of my invention illustrated as a muffle type furnace, it is obvious that changes in the construction and arrangement of the parts for different types of furnaces may be readily made, without departing from the spirit and the scope of the invention as defined in the appended claims.

I claim:

1. The method of preventing contamination of an enveloping atmosphere in a heat treatment chamber from gases in the insulation thereof, comprising the step of reducing pressure at the outer portion of the insulation to a pressure less than the pressure within the chamber to prevent inward flow of gases therefrom.

2. In the heat treatment of materials in a chamber having walls of porous material, the step of inflowing an enveloping atmosphere of combusted gases into said chamber and simultaneously subjecting the outer surfaces of said walls to a reduction in pressure to a pressure less than the pressure within the chamber, to induce outward flow of gases through said walls.

3. In combination, a heat treatment chamber, walls of insulating material therefor, means for conducting products of combustion of predetermined constituency into said chamber to form an enveloping atmosphere, and means for subjecting the outer walls of said insulating material to a pressure less than the pressure in said chamber.

4. In combination, a heat treatment chamber, walls of porous material therefor, means for conducting products of combustion of predetermined constituency into said chamber to form an enveloping atmosphere, and means for producing a differential pressure between the inner and outer walls of said porous material.

5. In combination, a heat treatment chamber, walls of porous insulating material therefor, a passageway chamber surrounding said insulating material, means for conducting products of combustion of predetermined constituency into said heat treatment chamber to form an enveloping atmosphere, and means for exhausting gases from said passageway chamber.

6. In combination, a heat treatment chamber, walls of porous material therefor, means for conducting gases of predetermined constituency into said chamber to form an enveloping atmosphere, and means for creating a pressure differential between the chamber and the surrounding wall material to induce flow of gases outwardly from said chamber through said material.

CARL I. HAYES.